Figure 1:
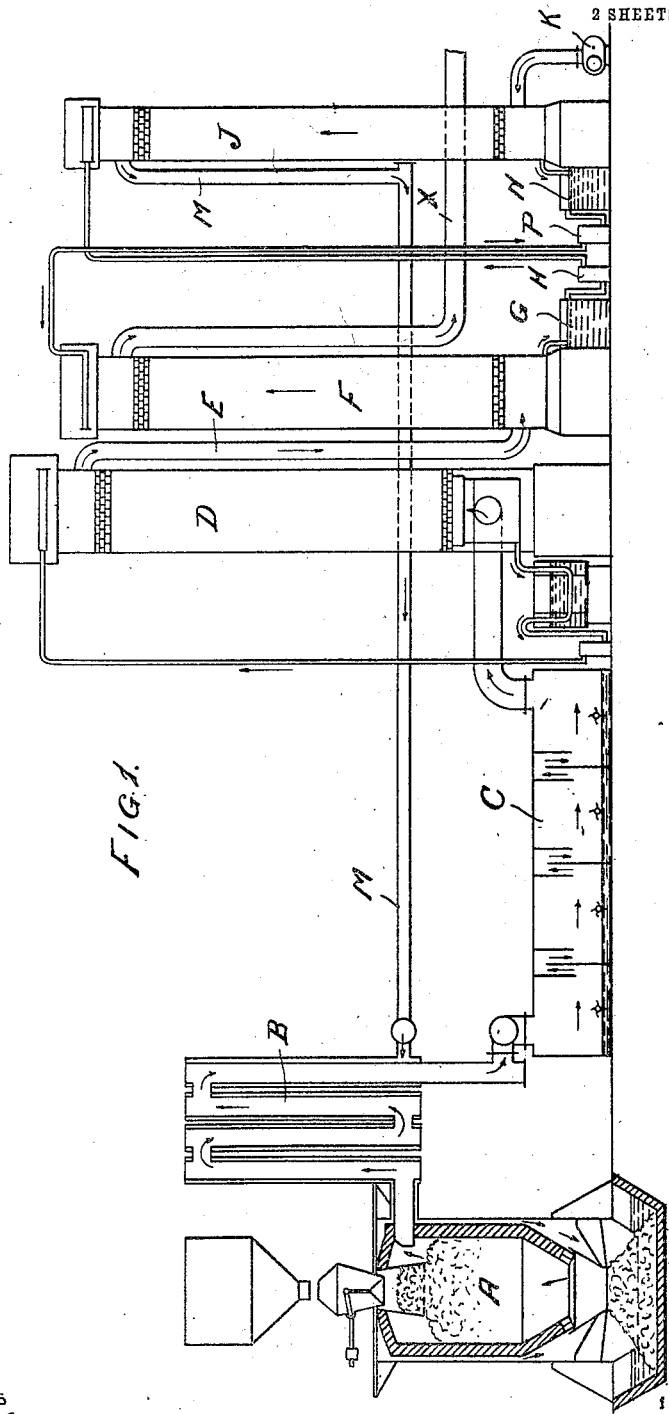

W. J. CROSSLEY & T. RIGBY.
PROCESS OF RECOVERING ACETIC ACID IN PRODUCER GAS PLANTS.
APPLICATION FILED AUG. 17, 1909.

998,234.

Patented July 18, 1911.

2 SHEETS—SHEET 1.

WITNESSES
John A. Percival
Wm. P. Jones

INVENTORS
William John Crossley & Thomas Rigby
By
Att'y

W. J. CROSSLEY & T. RIGBY.
PROCESS OF RECOVERING ACETIC ACID IN PRODUCER GAS PLANTS.
APPLICATION FILED AUG. 17, 1909.
998,234.
Patented July 18, 1911.
2 SHEETS—SHEET 2.
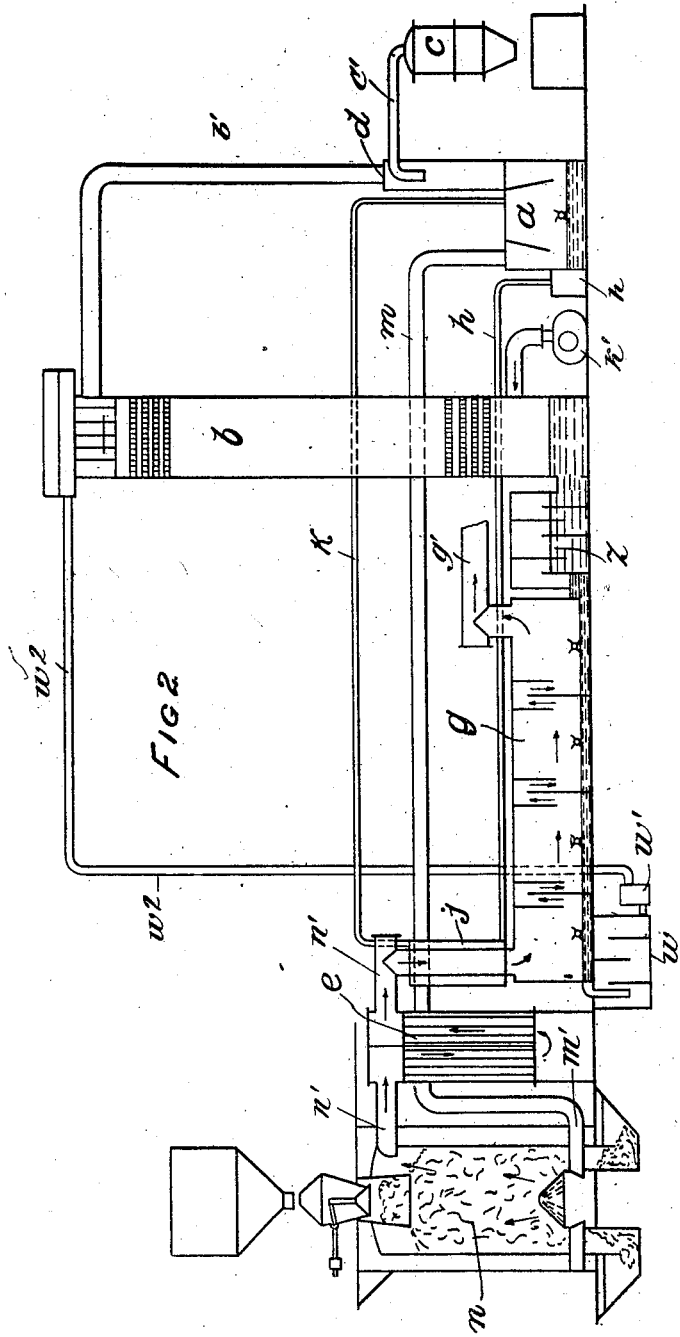
WITNESSES
INVENTORS
William John Crossley and Thomas Rigby
By
ATT'Y

UNITED STATES PATENT OFFICE.

WILLIAM JOHN CROSSLEY AND THOMAS RIGBY, OF MANCHESTER, ENGLAND.

PROCESS OF RECOVERING ACETIC ACID IN PRODUCER-GAS PLANTS.

998,234.  Specification of Letters Patent.  Patented July 18, 1911.

Application filed August 17, 1909. Serial No. 513,306.

*To all whom it may concern:*

Be it known that we, WILLIAM JOHN CROSSLEY and THOMAS RIGBY, both subjects of the King of Great Britain, residing the former at Openshaw, Manchester, in the county of Lancaster, England, and the latter at 948 Ashton Old Road, Fairfield, Manchester aforesaid, have invented new and useful Improvements in the Process of Recovering Acetic Acid in Producer-Gas Plants, of which the following is a specification.

This invention has for its object improvements in the recovery of the by-products obtained in working the type of plant known as an ammonia recovery gas producer plant and relates to the recovery of by-products other than ammonia from such plants. For the better understanding of these improvements we hereafter describe briefly the processes at present in use with such plants. The said plants are primarily designed to work at low temperatures, and in consequence a considerable proportion of the original nitrogen contained in the fuel is recovered in the form of ammonia. In order to make such a process an economic success it is found necessary in practice to cool the gases leaving the gas producer to such a temperature that a great proportion of the sensible heat of the gases and the sensible and latent heat of the steam present in the gases is recovered. A portion of the sensible heat is recovered by superheating the air and steam on their way to the gas producers. To recover the greater portion of the remainder of the heat it is usual to cool the gases and condense the water vapor present in them by means of circulating water or liquor, which heat is afterward recovered by regeneration in an air saturating tower.

In the accompanying 2 sheets of drawings,—Figure 1 is a diagram of what is commonly known as the Mond type of plant. Fig. 2 a diagram of the Crossley and Rigby type of plant, fitted with apparatus for recovering acetic acid and the vapors of evaporation hereafter described.

For the better understanding of our invention we will briefly describe the existing types of plant.

In Fig. 1 it will be seen that the gases produced in the gas producer A, are passed through the superheater B before entrance into the mechanical washer C. In the mechanical washer C they are cooled by water spray and freed from the dust they usually contain, leaving the washer at a temperature approximately ninety degrees centigrade. The gases are then passed through an acid tower D where ascending through checker work they are met by a stream of sulfate liquor containing free sulfuric acid in its composition to absorb the ammonia present in the gases. Leaving the acid tower D comparatively free from ammonia, the gases descend by way of the pipe E, to the foot of the gas cooling tower F, the function of which is to cool them to a still lower temperature and condense most of the water vapor present in them. This is effected by water which is pumped up and circulated down the tower F through checker work and in the opposite direction to the gases ascending through the checker work. Leaving the gas cooling tower F they are usually taken away through a pipe X directly for use if intended for heating purposes, or are subjected to further cooling and purification if they are to be used in gas engines. The water leaving the foot of the gas cooling tower F in a heated condition passes into the tank G from whence it is pumped by the pump H to the top of the third tower J known as the air saturating tower, where, descending through checker work it is met by air from the blower K on its way to the gas producers and the intimate contact obtained causes the water to be cooled and the air to be heated and fully saturated with water vapor at the temperature it leaves the tower. The saturated air is then passed by way of the pipe M to the superheaters and gas producers, while the water leaving the foot of the tower J passes into the tank N and is re-circulated by means of the pump P through the gas cooling tower F. These interchanges of heat take place continuously.

An improved system was brought out by the present applicants and British Letters Patent numbered 24144 of 1906 were granted to them, for such system, which mainly consists in washing and cooling the gases, condensing the water vapor and absorbing the ammonia in one and the same apparatus. In addition to this the actual sulfate liquor circulated is used for the purpose of simultaneously saturating the air with water vapor in the air saturating tower and simultaneously this action cools the liquor sufficiently for it to be used for re-circulation through the washing, condensing and absorbing apparatus. By this means a considerable reduction in the number of parts is made. In such recovery plants when using certain fuels, such as peat, considerable quantities of acetic acid are given off with the gases and the object of this invention is to provide means for successfully recovering this acetic acid in marketable form, without prejudicing the yield of ammonia. In practice the acetic acid, although having a higher boiling point than water, is very volatile and is somewhat difficult to recover at any temperature.

When gasifying peat in the Mond type of plant a portion of the acetic acid is condensed and brought down in the mechanical gas washer in solution with the water contained therein, either as acetic acid or in combination. A large proportion of acetic acid is also condensed and recovered in the next apparatus, namely the acid tower and a further large proportion is recovered in the water circulated through the gas cooling tower. When using the Mond type of plant we systematically take the water from the mechanical gas washer and add it to the sulfate liquor which is being circulated through the acid tower, and as a result any acetate of ammonia contained therein is broken up and the ammonia absorbed by the sulfuric acid, thereby forming sulfate of ammonia and leaving the acetic acid in solution in the liquor. We find when using our aforesaid patented system that most of the acetic acid is recovered in the sulfate liquor and this is peculiarly desirable when using the process hereinafter described.

It is usual with both the aforesaid types of plant to keep the sulfate liquor in circulation at a strength of from thirty to forty degrees Twaddell, afterward concentrating it further in evaporating pans for the purpose of crystallization of the sulfate in the marketable form, the mother liquor drained from the crystals being passed again into the sulfate liquor for circulation. While this evaporation is taking place in the pans we find that most of the acetic acid contained in the sulfate liquor is passed off with the vapors of evaporation. These vapors of evaporation are usually wasted but in this invention we treat them in such a manner that the acetic acid is recovered and this recovery of the acetic acid from the vapors of evaporation may be done in any suitable and known manner and we deliberately arrange the process of recovery so that all or most of the acetic acid is contained in the sulfate liquor. We find that it is an easy matter to pass over ninety per cent. of the acetic acid contained in the liquor away with the vapors of evaporation, even though the temperature of evaporation be lower than the boiling temperature of pure acetic acid, and that portion of the acetic acid which is not passed over with the vapors remains in the mother liquor drained from the crystals, and being re-circulated with the sulfate liquor, practically all of it is finally recovered. We wish to make it quite clear that we do not limit our claims to any particular form of recovery of the acetic acid from these vapors of evaporation, but claim broadly the process of collecting the acetic acid in the sulfate liquor and recovering the acetic acid in any desirable manner from the vapors of evaporation given off during concentration of the sulfate liquor.

One of the methods in which the acetic acid may be recovered from the vapors of evaporation is to pass these vapors through a surface condenser or equivalent arrangement in such a manner that the vapors are condensed, so forming a dilute solution of acetic acid. If this method is adopted a still or like apparatus becomes necessary to recover the acetic acid in marketable form. Another method is to condense the vapors by direct contact with water or any suitable liquor in such a manner that the acetic acid is condensed with the steam and taken up in solution with the condensing liquor, but the quantity of liquor to be treated by this method is abnormally large. The method which we find most practicable and which we prefer to use is as is hereinafter described, wherein the acid vapors are arranged to saturate air or other suitable gases intended for the gas producer before being washed by a suitable alkaline solution. No stills or other apparatus necessitating auxiliary heat are required by this method and the same concentration of the liquor which is necessary to make ammonium sulfate crystals also enables the acetic acid to be recovered continuously.

We have previously stated that the acetic acid is very volatile at all temperatures up to its boiling point and we find this to be the case whether it is in solution with water or sulfate liquor, and as a consequence when circulating with sulfate liquor or water in an air saturating tower a large proportion of any acetic acid contained in them is carried off in the form of vapor by the saturated air on its way to the gas producers. To recover this acetic acid we provide and arrange an alkali scrubber or washer or like apparatus between the air saturating tower and the superheaters and gas producers and in such an arrangement we wash the saturated air from the air saturating tower with a hot alkaline solution, such as milk of lime or soda, intimate contact being obtained with the saturated air in any suitable manner.

In Fig. 2 it will be seen that an alkaline washer $a$ is used for the purpose of recovering the acids contained not only in the air supplied through the pipe $b'$ from the air saturating tower $b$ to the air main $d$, but also that contained in the vapors of evaporation from the evaporating pan $c$ and this is done by passing the vapors of evaporation through the pipe $c'$ into the air main $d$, conveying the saturated air from the air saturating tower $b$, the mixture being washed by a heated alkaline solution in one and the same apparatus $a$. It is obviously desirable to arrange this combination where possible and we prefer generally to use an apparatus of this nature when recovery of the acetic acid is carried out. The alkaline solution in the washer $a$ is kept heated by any suitable means but we prefer to arrange that the alkaline liquor be circulated in contact with the hot gas coming from the superheaters $e$ and before entrance to the ammonia absorbing apparatus $g$. The liquor is shown in Fig. 2 circulated by means of the pump $h'$ through the pipe $h$ to the liquor heating device $j$, the heated liquor leaving the device $j$ being conveyed back to the washer $a$ by means of the pipe $k$. It will also be seen that the air leaves the washer $a$ by means of the pipe $m$ being thence conveyed direct to the superheater $e$ and so on through the air supply pipe $m'$ to the gas producer $n$. From the producer $n$ the hot gases pass through the superheater $e$ and pipe $n'$ through the liquor heating device $j$ to the ammonia absorber $g$ the purified gases leaving the absorber by a pipe $g'$ whence they are conducted to any point desired. From the absorber $g$ the acid liquor overflows into a tank $w$ whence it is pumped by a pump $w'$ through a pipe $w^2$ to the air saturating tower $b$. From the tower $b$ the acid liquor returns through the settling tank $z$ to the ammonia absorber $g$. The alkaline solution in the washer $a$ is usually heated at or above the temperature of saturation in such an arrangement so that condensation of vapor in the pipe $m$ is reduced to a minimum. Besides recovering the acetic acid we also recover the heat of the vapors of evaporation and we find that the air supplied through the pipes $m$, $m'$, to the gas producers instead of being saturated at about seventy three degrees centigrade as is usual from an air saturating tower such as $b$, is now saturated at nearly eighty degrees centigrade, without addition of any auxiliary steam. The acetate formed in the washer $a$ contains in practice small quantities of impurities but there is no difficulty in obtaining an acetate of a strength sufficient for commercial purposes. The alkaline liquor is taken away from the washer $a$ from time to time and treated in the usual manner for recovery of the acetate in marketable form. Large quantities of steam have to be used in all cases with the air blast maintained by the blower $K'$ to keep the producers $n$ at a low temperature, and in practice most of this steam has to be raised from auxiliary sources. By utilizing these acid vapors after neutralization a considerable quantity of otherwise wasted heat is recovered and the size of the auxiliary steam raising plant can be correspondingly reduced while at the same time the acetic acid is recovered in marketable form.

When we mention in this specification, a washer or scrubber, which we wish to use in our processes, we wish it to be understood that we do not limit our claims to the forms of washer or scrubber shown in the drawings but may use any known apparatus designed with a similar object for the same purpose. We also wish it to be understood that our descriptions of the Mond system and Crossley and Rigby system are as they are commonly used, but that variations are made with both types of plant in the form of apparatus although the same principles involved are generally applied.

What we claim as our invention and desire to secure by Letters Patent is:—

1. The process of recovering acetic acid from the gases given off by fuel in recovery plants, which consists in subjecting the gases to the action of a sulfate liquor containing free sulfuric acid, concentrating the resulting liquid, saturating gases with the vapors of evaporation given off during said concentration, washing said saturated gases with a liquid and recovering the acetic acid from said last-mentioned liquid.

2. The process of recovering acetic acid from the gases given off by fuel in recovery plants, which consists in subjecting the gases to the action of a sulfate liquor containing free sulfuric acid, concentrating the resulting liquid, saturating gases with the vapors of evaporation given off during said concentration, washing said saturated gases with an alkaline solution and recovering the acetic acid from said solution.

3. The process of recovering acetic acid from the gases given off by fuel in recovery plants, which consists in subjecting the gases to the action of a sulfate liquor containing free sulfuric acid, concentrating the resulting liquid, saturating gases with the vapors of evaporation given off during said concentration, washing said saturated gases with a heated alkaline solution and recovering the acetic acid from said solution.

In testimony whereof we have signed our names to this specification in the presence of two subscribing witnesses.

WILLIAM JOHN CROSSLEY.
THOMAS RIGBY.

Witnesses to signature of William John Crossley:
DAVID CORRY,
RICHARD JAMES.

Witnesses to signature of Thomas Rigby:
JOSEPH CARTER,
ALBERT OGDEN.